US007002576B2

(12) United States Patent
Sheffield et al.

(10) Patent No.: US 7,002,576 B2
(45) Date of Patent: Feb. 21, 2006

(54) SYSTEM AND METHOD FOR ANALYZING A REGION OF INTEREST RELATIVE TO A PREDETERMINED EVENT

(75) Inventors: Tatum M. Sheffield, Missouri City, TX (US); Jack Lees, Houston, TX (US)

(73) Assignee: Magic Earth, Inc., Houston, TX (US)

( * ) Notice: Subject to any disclaimer, the term of this patent is extended or adjusted under 35 U.S.C. 154(b) by 245 days.

(21) Appl. No.: 10/718,018

(22) Filed: Nov. 20, 2003

(65) Prior Publication Data

US 2005/0110795 A1    May 26, 2005

(51) Int. Cl.
*G06T 17/00*    (2006.01)
(52) U.S. Cl. ...................... 345/424; 345/419; 345/420; 345/581
(58) Field of Classification Search ................ 345/424, 345/419, 420, 581
See application file for complete search history.

(56) References Cited

U.S. PATENT DOCUMENTS

| | | | |
|---|---|---|---|
| 5,734,384 A | 3/1998 | Yanof et al. ................. | 345/424 |
| 6,690,820 B1 | 2/2004 | Lees et al. .................. | 382/154 |
| 2002/0090121 A1 * | 7/2002 | Schneider et al. .......... | 382/128 |

FOREIGN PATENT DOCUMENTS

| WO | WO 00/14574 | 3/2000 |
|---|---|---|
| WO | WO 02/37422 A1 | 5/2002 |

OTHER PUBLICATIONS

Lees, Jack, "Constructing Faults from Seed Picks by Voxel Tracking," Mar. 1999, pp. 338, 340, *The Leading Edge*.
LeLeux, David E., "What's New in Geophysics and Seismic-Related Operations," May 1995, pp. 59-60, *World Oil*.
"Texaco E&P Center Allows Visual Prove of 3D Data Volumes.," Jun. 1, 1998, pp. 46-47 (copies on one page), *Oil & Gas Journal*.
"Does Your 3D Interpretation Software Move As Fast As You Do?," undated, 2 pages, brochure published by Magic Earth™ The GeoProbe™ Company.
Kilgard, Mark J., "A Practical and Robust Bump-mapping Technique for Today's GPUs," Jul. 5, 2000, pp. 1-39, NVIDIA Corporation, Santa Clara, CA.
Parker, David, "Systems Aspects of Visualization Applications," 1995, pp. 241-265, *System Architecture*, Chapter 8, CRC Press, Inc.
Wang, Sidney W. and Kaufman, Arie E., "Volume Sculpting, " 1995, pp. 151-156, 214, presented at the Symposium on Interactive 3D Graphics, Monterey, CA.
Sheffield, Tatum M., et al., "Geovolume visualization interpretation: post migration workflow," Aug. 8, 2000, four (4) pages, presented at the Aug. 2000 SEG Annual Conference.

* cited by examiner

*Primary Examiner*—Matthew C. Bella
*Assistant Examiner*—Tam Tran
(74) *Attorney, Agent, or Firm*—Crain Caton & James P.C.

(57) ABSTRACT

A system and method are disclosed for analyzing a three-dimensional (3-D) region of interest relative to a predetermined event. The system and method are particularly useful as analytical, diagnostic and interpretive tools for any type of scientific data.

32 Claims, 4 Drawing Sheets

SYSTEM AND METHOD FOR ANALYZING A REGION OF INTEREST RELATIVE TO A PREDETERMINED EVENT

CROSS-REFERENCE TO RELATED APPLICATIONS

Not applicable.

STATEMENT REGARDING FEDERALLY SPONSORED RESEARCH

Not applicable.

FIELD OF THE INVENTION

The present invention relates to a system and method for analyzing a three-dimensional region of interest relative to a predetermined event. The system and method may be used to locate and image a preferred feature of the region of interest otherwise indistinguishable from the event.

BACKGROUND OF THE INVENTION

In the applied sciences, various fields of study require the analysis of two-dimensional (2-D) or three-dimensional (3-D) volume data sets wherein each data set may have multiple attributes representing different physical properties. An attribute, sometimes referred to as a data value, represents a particular physical property of an object within a defined 2-D or 3-D space. A data value may, for instance, be an 8-byte data word which includes 256 possible values. The location of an attribute is represented by (x, y, data value) or (x, y, z, data value). If the attribute represents pressure at a particular location, then the attribute location may be expressed as (x, y, z, pressure).

In the medical field, a computerized axial topography (CAT) scanner or magnetic resonance imaging (MRI) device is used to produce a picture or diagnostic image of some specific area of a person's body, typically representing the coordinate and a determined attribute. Normally, each attribute within a predetermined location must be imaged separate and apart from another attribute. For example, one attribute representing temperature at a predetermined location is typically imaged separate from another attribute representing pressure at the same location. Thus, the diagnosis of a particular condition based upon these attributes is limited by the ability to display a single attribute at a predetermined location.

In the field of earth sciences, seismic sounding is used for exploring the subterranean geology of an earth formation. An underground explosion excites seismic waves, similar to low-frequency sound waves that travel below the surface of the earth and are detected by seismographs. The seismographs record the time of arrival of seismic waves, both direct and reflected waves. Knowing the time and place of the explosion the time of travel of the waves through the interior can be calculated and used to measure the velocity of the waves in the interior. A similar technique can be used for offshore oil and gas exploration. In offshore exploration, a ship tows a sound source and underwater hydrophones. Low frequency, (e.g., 50 Hz) sound waves are generated by, for example, a pneumatic device that works like a balloon burst. The sounds bounce off rock layers below the sea floor and are picked up by the hydrophones. In either application, subsurface sedimentary structures that trap oil, such as faults and domes are mapped by the reflective waves.

The data is collected and processed to produce 3-D volume data sets. A 3-D volume data set is made up of "voxels" or volume elements having x, y, z coordinates. Each voxel represents a numeric data value (attribute) associated with some measured or calculated physical property at a particular location. Examples of geological data values include amplitude, phase, frequency, and semblance. Different data values are stored in different 3-D volume data sets, wherein each 3-D volume data set represents a different data value. In order to analyze certain geological structures referred to as "events," information from different 3-D volume data sets must be separately imaged in order to analyze the event.

Certain techniques have been developed in this field, however, for imaging multiple 3-D volume data sets in a single display. One example includes the technique published in *The Leading Edge* called "Constructing Faults from Seed Picks by Voxel Tracking" by Jack Lees. This technique combines two 3-D volume data sets in a single display, thereby restricting each original 256-value attribute to 128 values of the full 256-value range. Another conventional method combines the display of two 3-D volume data sets, containing two different attributes, by making some data values more transparent than others. This technique becomes untenable when more than two attributes are combined.

Other, more advanced, techniques used to combine two different 3-D volume data sets in the same image are illustrated in U.S. patent application Ser. No. 09/936,780 and Ser. No. 10/628,781 assigned to Magic Earth, Inc. and incorporated herein by reference.

The '780 application describes a technique for combining a first 3-D volume data set representing a first attribute and a second 3-D volume data set representing a second attribute in a single enhanced 3-D volume data set by comparing each of the first and second attribute data values with a preselected data value range or criteria. For each data value where the criteria are met, a first selected data value is inserted at a position corresponding with the respective data value in the enhanced 3-D volume data set. For each data value where the criteria are not met, a second selected data value is inserted at a position corresponding with the respective data value in the enhanced 3-D volume data set. The first selected data value may be related to the first attribute and the second selected data value may be related to the second attribute. The resulting image is an enhanced 3-D volume data set comprising a combination of the original first 3-D volume data set and the second 3-D volume data set. The '780 application also describes a technique for displaying an enhanced 3-D volume data set related to one of a plurality of attributes by selecting attribute data values within a predetermined data value range and inserting a preselected data value at a position corresponding with the data value in the enhanced 3-D volume data set when the data value is within the data value range, or inserting another preselected data value at a position corresponding with the respective data value in the enhanced 3-D volume data set when the data value is not within the data value range. The resulting image is an enhanced 3-D volume data set comprising a combination of the original enhanced 3-D volume data set data values, the preselected data values and/or the another preselected data values. In either technique, the image may be further enhanced by the application of an autopicking technique that utilizes an initial seed pick to autopick all connected data values having the same data value as the seed pick. This technique is particularly useful for determining the extent of an event related to a physical phenomenon.

The '781 application describes another technique for corendering multiple attributes in real time thus, forming a combined image of the attributes. The combined image is visually intuitive in that it distinguishes certain features of an object that are otherwise substantially indistinguishable in their natural environment.

Another technique used to analyze certain geological events, like faults and other formation anomalies, is illustrated in U.S. patent application Ser. No. 09/936,682 assigned to Magic Earth, Inc. and incorporated herein by reference. The '682 application describes a technique for imaging and/or tracking a physical phenomena, such as a geological fault, by selecting control points from various locations corresponding to a 3-D data volume set to define a first spline curve and a second spline curve. A surface may be interpolated between the first spline curve and the second spline curve that is representative of the physical phenomena. This technique may also be used to define other surfaces and boundaries of geological formations.

Another technique used to analyze similar geological events is illustrated in U.S. patent application Ser. No. 09/119,635 assigned to Magic Earth, Inc. and incorporated herein by reference. The '635 application describes a technique for imaging and manipulating the image of a 3-D sampling probe, in real time, that is a subset of a larger 3-D volume data set. As the 3-D sampling probe moves through the larger 3-D volume data set, the imaging on the surfaces of the 3-D sampling probe is redrawn "on the fly" so that the image is perceived to change in real time with movement of the 3-D sampling probe thus, enabling a more intuitive analysis of the geological events represented by the 3-D volume data set.

The techniques thus described may be used to locate an image certain attributes representative of geological events like gas-producing regions found in sand and sandstone. Gas-producing regions, however, may be difficult to distinguish from other geological regions comprising limestone and dolomite. In other words, attributes representing gas-producing sands may be masked or otherwise obscured by attributes representing limestone or dolomite. Therefore, there is a need to effectively locate and distinguish attributes representing gas-producing sands from other related geological regions comprising limestone and dolomite.

SUMMARY OF THE INVENTION

The present invention provides an effective system and method for analyzing a 3-D region of interest relative to a predetermined event when there is a correlation between attributes representing a preferred feature of the region of interest and attributes representing the event.

The method generally comprises the steps of defining the region of interest relative to a boundary of the event. A first attribute and a second attribute are selected representing the region of interest. A first attribute volume and a second attribute volume are calculated for the region of interest. The first attribute volume and the second attribute volume each comprise a plurality of voxels, wherein each voxel is defined by a set of x, y, z coordinates and a data value. A first set of voxels is selected from the first attribute volume that has a data value within a first attribute data value range. The first set of voxels represents a preferred feature of the region of interest. A second set of voxels is selected from the second attribute volume that has a data value within a second attribute data value range. The second set of voxels also represents the preferred feature. The first set of voxels and the second set of voxels may be imaged representing the preferred feature.

The system for performing the method of the present invention may comprise a program storage device readable by a machine. The storage device may embody a program of instructions executable by the machine for performing the method of the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention will now be described with reference to the accompanying drawings, in which like elements are referenced with like reference numerals, and in which.

DETAILED DESCRIPTION OF THE PREFERRED EMBODIMENTS

The present invention may be implemented using hardware, software or a combination thereof, and may be implemented in a computer system or other processing system. The following description applies the present invention to various seismic data attributes, which are contained within a specified space or volume Each volume comprises voxel data represented by x, y, z coordinates and a data value. Each data value is associated with a particular seismic data attribute at a specified location (x, y, z). The present invention, therefore, may employ one or more of the hardware and software system components required to display and analyze the volume as described in the '634, '780 and '781 applications.

In addition to the foregoing hardware and/or software system components that may be employed, the present invention may be implemented using current high performance graphics and personal computer commodity hardware in order to insure real time performance. Examples of available hardware include graphics cards like GeForce® marketed by NVIDIA® and 2.4 Ghz×86 instruction set computer processors manufactured by Intel® or AMD®.

Figure 1:
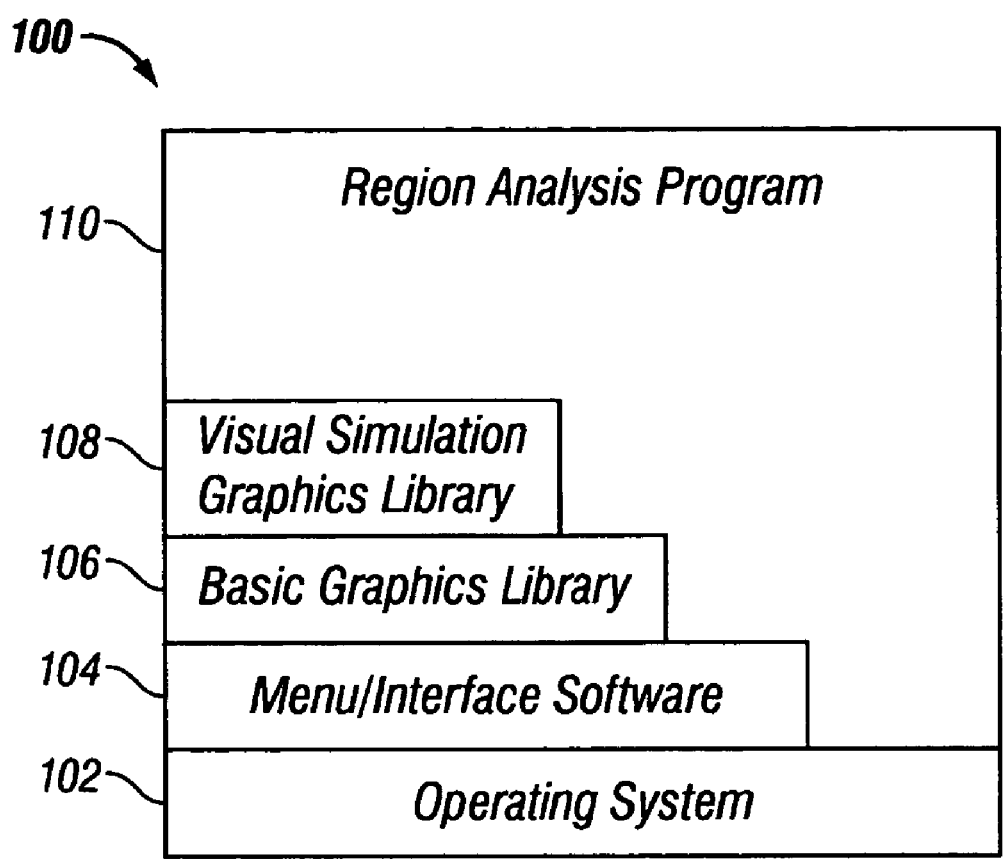
FIG. 1 is a block diagram illustrating one embodiment of a software program for implementing the present invention.

One embodiment of a software or program structure for implementing the present invention is shown in FIG. 1. At the base of program structure 100 is an operating system 102. Suitable operating systems may include, for example, UNIX® or LINUX® operating systems, Windows NT®, and other operating systems generally known in the art.

Menu and interface software 104 overlays operating system 102. Menu and interface software 104 are used to provide various menus and windows to facilitate interaction with the user, and to obtain user input and instructions. Menu and interface software 104 may include, for example, Microsoft Windows®, X Free 86®, MOTIF®, and other menu and interface software generally known in the art.

A basic graphics library 106 overlays menu and interface software 104. Basic graphics library 106 is an application programming interface (API) for 3-D computer graphics. The functions performed by basic graphics library 106 include, for example, geometric and raster primitives, RGBA or color index mode, display list or immediate mode, viewing and modeling transformations, lighting and shading, hidden surface removal, alpha blending (translucency), anti-aliasing, texture mapping, atmospheric effects (fog, smoke, haze), feedback and selection, stencil planes, and accumulation buffer.

A particularly useful basic graphics library 106 is OpenGL®, marketed by Silicon Graphics, Inc. ("SGI®"). The OpenGL® API is a multi-platform industry standard that is hardware, window, and operating system independent. OpenGL® is designed to be callable from C, C++, FORTRAN, Ada and Java programming languages. OpenGL® performs each of the functions listed above for basic graphics library 106. Some commands in OpenGL® specify geometric objects to be drawn, and others control how the objects are handled. All elements of the OpenGL® state, even the contents of the texture memory and the frame buffer, can be obtained by a client application using OpenGL®. OpenGL® and the client application may operate on the same or different machines because OpenGL is network transparent. OpenGL® is described in more detail in the OpenGL® Programming Guide (ISBN: 0-201-63274-8) and the OpenGL® Reference Manual (ISBN: 0-201-63276-4), both of which are incorporated herein by reference.

Visual simulation graphics library 108 overlays the basic graphics library 106.

Visual simulation graphics library 108 is an API for creating real-time, multi-processed 3-D visual simulation graphics applications. Visual simulation graphics library 108 provides functions that bundle together graphics library state control functions such as lighting, materials, texture, and transparency. These functions track state and the creation of display lists that can be rendered later.

A particularly useful visual simulation graphics library 108 is OpenGL Performer®, which is available from SGI®. OpenGL Performer® supports the OpenGL® graphics library discussed above. OpenGL Performer® includes two main libraries (libpf and libpr) and four associated libraries (libpfdu, libpfdb, libpfui, and libpfutil).

The basis of OpenGL Performer® is the performance rendering library libpr, a low-level library providing high speed rendering functions based on GeoSets and graphics state control using GeoStates. GeoSets are collections of drawable geometry that group same-type graphics primitives (e.g., triangles or quads) into one data object. The GeoSet contains no geometry itself, only pointers to data arrays and index arrays. Because all the primitives in a GeoSet are of the same type and have the same attributes, rendering of most databases is performed at maximum hardware speed. GeoStates provide graphics state definitions (e.g., texture or material) for GeoSets.

Layered above libpr is libpf, a real-time visual simulation environment providing a high-performance multi-process database rendering system that optimizes use of multiprocessing hardware. The database utility library, libpfdu, provides functions for defining both geometric and appearance attributes of 3-D objects, shares state and materials, and generates triangle strips from independent polygonal input. The database library libpfdb uses the facilities of libpfdu, libpf and libpr to import database files in a number of industry standard database formats. The libpfui is a user interface library that provides building blocks for writing manipulation components for user interfaces (C and C++ programming languages). Finally, the libpfutil is the utility library that provides routines for implementing tasks and graphical user interface (GUI) tools.

An application program which uses OpenGL Performer® and OpenGL® API typically performs the following steps in preparing for real-time 3-D visual simulation:

1. Initialize OpenGL Performer®;
2. Specify number of graphics pipelines, choose the multiprocessing configuration, and specify hardware mode as needed;
3. Initialize chosen multiprocessing mode;
4. Initialize frame rate and set frame-extend policy;
5. Create, configure, and open windows as required; and
6. Create and configure display channels as required.

Once the application program has created a graphical rendering environment by carrying out steps 1 through 6 above, then the application program typically iterates through the following main simulation loop once per frame:

7. Compute dynamics, update model matrices, etc.;
8. Delay until the next frame time;
9. Perform latency critical viewpoint updates; and
10. Draw a frame.

Alternatively, Open Scene Graph® can be used as the visual simulation graphics library 108. Open Scene Graph® operates in the same manner as OpenGL Performer®, providing programming tools written in C/C++ for a large variety of computer platforms. Open Scene Graph® is based on OpenGL® and is available through www.openscenegraph.com.

A region analysis program 110 representing the present invention overlays visual simulation graphics library 108. In a manner generally well known in the art, program 110 interfaces with, and utilizes the functions carried out by, the visual simulation graphics library 108, basic graphics library 106, menu and interface software 104, and operating system 102. Program 110 is preferably written in an object oriented programming language to allow the creation and use of objects and object functionality. One preferred object oriented programming language is C++.

In this particular embodiment, program 110 stores the 3-D volume data set in a manner generally well known in the art. For example, the format for a particular data volume may include two parts: a volume header followed by the body of data that is as long as the size of the data set. The volume header typically includes information in a prescribed sequence, such as the file path (location) of the data set, size, dimensions in the x, y, and z directions, annotations for the x, y, and z axes, annotations for the data value, etc. The body of data is a binary sequence of bytes and may include one or more bytes per data value. For example, the first byte is the data value at volume location (0, 0, 0); the second byte is the data value at volume location (1, 0, 0); and the third byte is the data value at volume location (2, 0, 0). When the x dimension is exhausted, then the y dimension and the z dimension are incremented, respectively. This embodiment is not limited in any way to a particular data format.

The program 110 facilitates input from a user to identify one or more 3-D volume data sets to use for analysis and imaging. When a plurality of data volumes are used, the data value for each of the plurality of data volumes represents a different physical parameter or attribute for the same geographic space. By way of example, a plurality of data volumes could include a geology volume, a temperature volume, and a water-saturation volume. The voxels in the geology volume can be expressed in the form (x,y,z, seismic amplitude). The voxels in the temperature volume can be expressed in the form (x,y,z, ° C.). The voxels in the water-saturation volume can be expressed in the form (x,y,z, % saturation). The physical or geographic space defined by the voxels in each of these volumes is the same. However, for any specific spatial location $(x_0,y_0,z_0)$, the seismic amplitude would be contained in the geology volume, the temperature in the temperature volume, and the water-saturation in the water-saturation volume. The operation of program 110 is described in reference to FIGS. 2 through 5.

Figure 2:
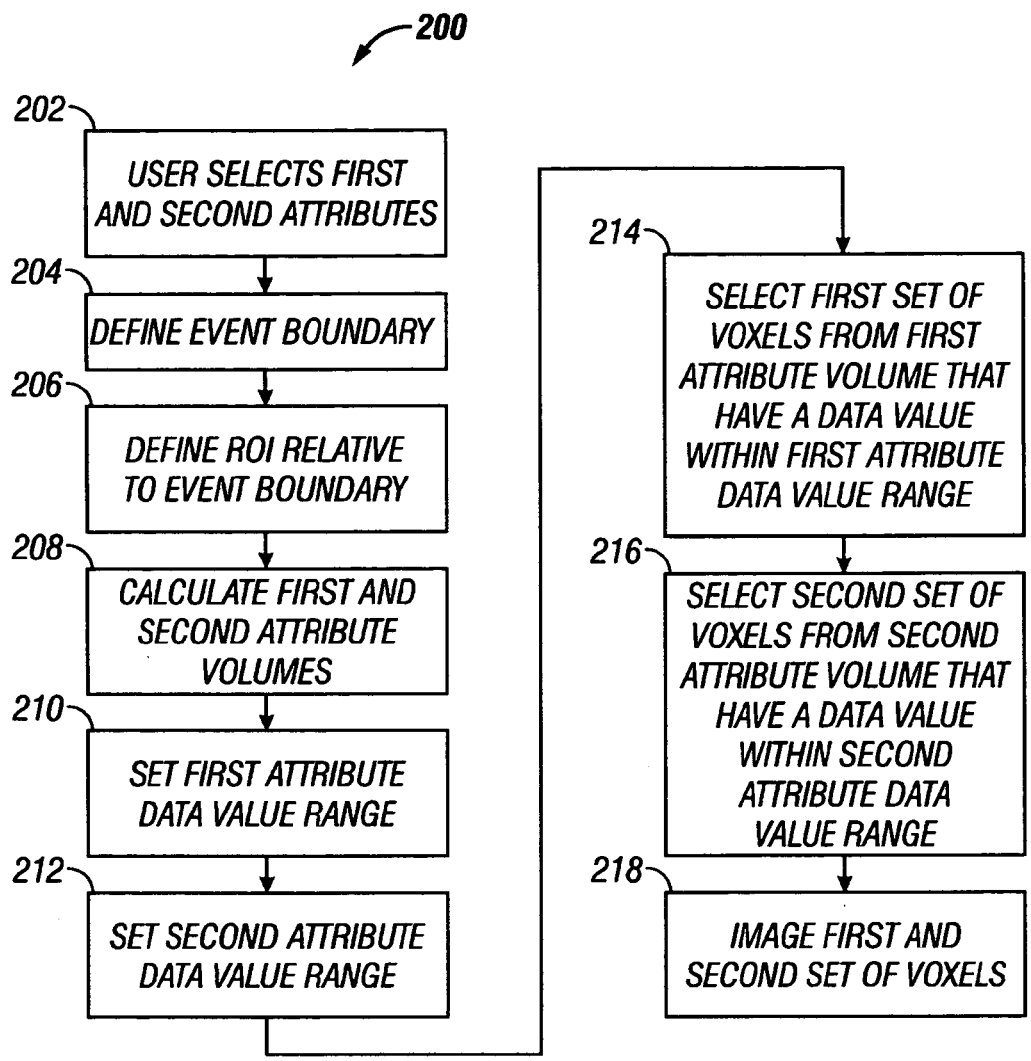
FIG. 2 is a flow diagram illustrating one embodiment of a method for implementing the present invention.

Referring now to FIG. 2, a method 200 is illustrated for analyzing a 3-D region of interest relative to a predetermined event. In step 202, a first attribute and a second attribute are selected from the available attributes using the GUI tools (menu/interface software 104) described in reference to FIG. 1. The first attribute and the second attribute represent a geological region of interest where gas-bearing sands may be found. The first attribute and the second attribute each represent an acoustic signal comprising instantaneous amplitude and instantaneous frequency, respectively. Although there are other available well-known attributes such as amplitude, frequency, phase, instantaneous phase, semblance, and coherence, instantaneous amplitude and instantaneous frequency are the preferred attributes representing the presence of sand and/or sandstone in the region of interest.

In step 204, an event boundary is defined to provide a reference point for the region of interest. Because there is a known correlation between sand or sandstone and limestone or dolomite, these formation properties are the preferred or predetermined event.

Figure 3:
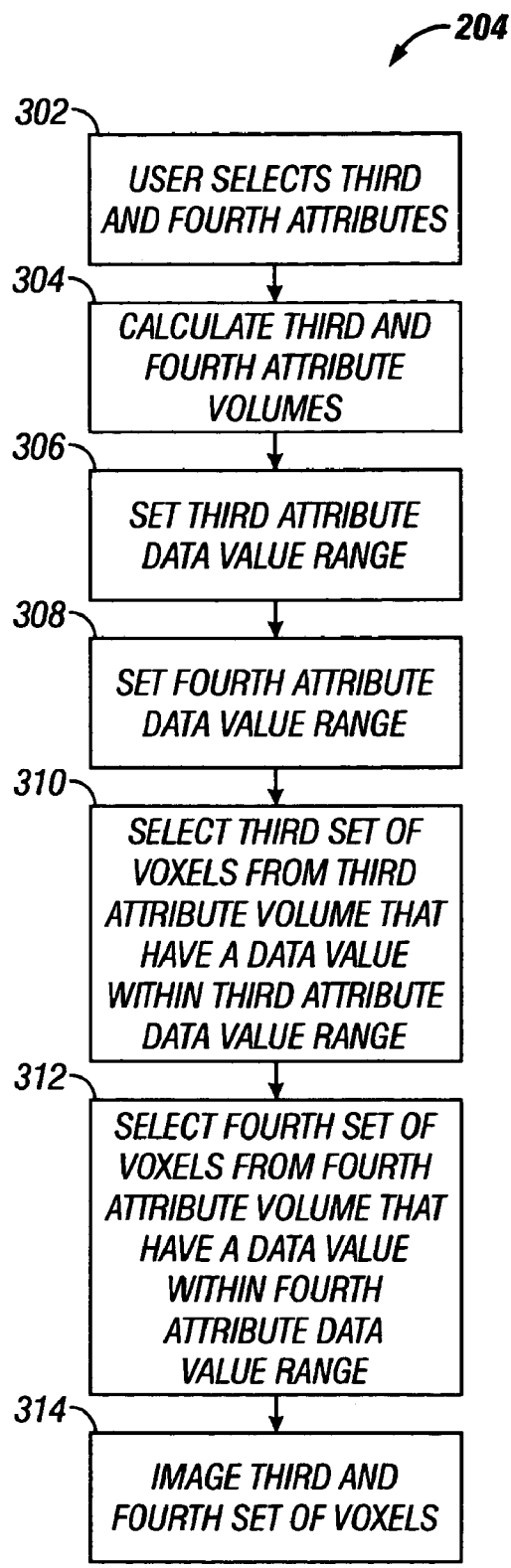
FIG. 3 is a flow diagram illustrating step 206 in FIG. 2.

Referring to FIG. 3, the process of defining the event boundary (step 204) as a reference point is more fully described. In step 302, a third attribute and a fourth attribute are selected from the available attributes using the GUI tools (menu/interface software 104) described in reference to FIG. 1. The third attribute and the fourth attribute represent the predetermined event, that is limestone or dolomite. The third attribute and fourth attribute each represent an acoustic signal comprising amplitude and phase, respectively. Although other well-known available attributes may be selected, in combination, or alone, amplitude and phase are the preferred attributes representing the presence of limestone or dolomite.

Figure 4:
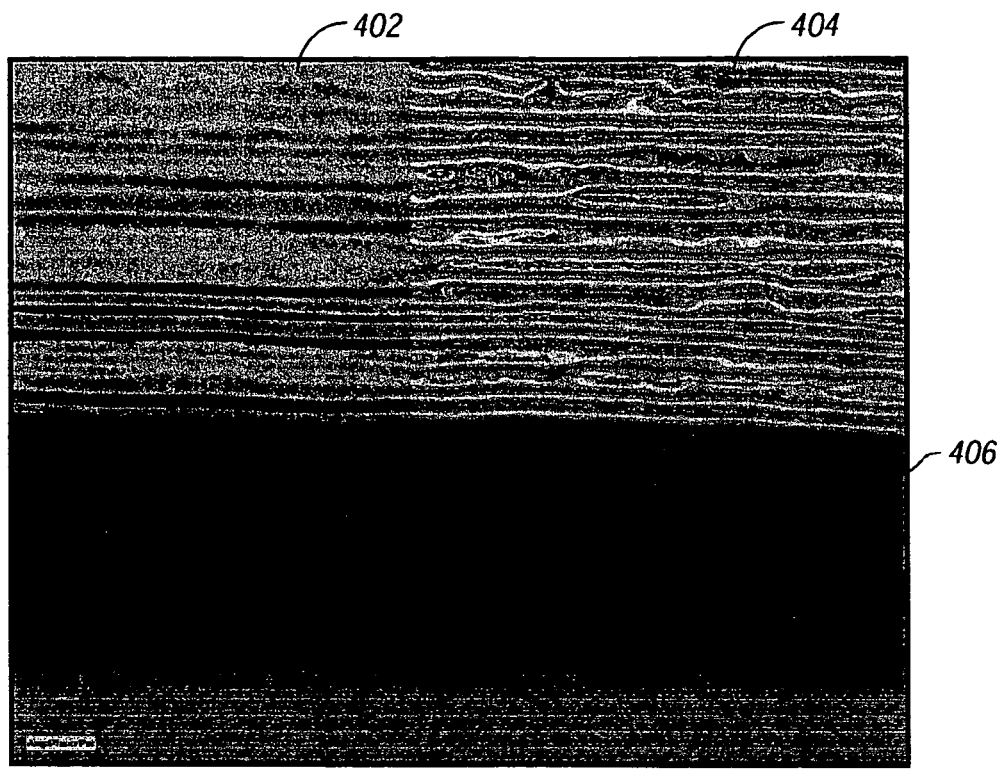
FIG. 4 is a color drawing illustrating seismic data attributes representing a geological event and a boundary of the event.

In step 304, a third attribute volume is calculated using the third attribute and a fourth attribute volume is calculated using the fourth attribute. The third attribute volume 402 and the fourth attribute volume 404 are illustrated in FIG. 4. Although the third attribute volume 402 and the fourth attribute volume 404 are illustrated side-by-side in FIG. 4, they have the same spatial coordinates but a different data value. The third attribute volume 402 and the fourth attribute volume 404 may be calculated using conventional shading/opacity (texture mapping) techniques, however, may also be calculated using volume rendering techniques generally well known in the art. In order to display seismic data in the manner thus described, voxel data is read from memory and converted into a specified color representing a specified texture. Textures are tiled in a 256 pixel by 256 pixel images. For larger volumes, many tiles exist on a single plane or surface. This process is commonly referred to by those skilled in the art as sampling, and is coordinated among multiple CPUs on a per tile basis. This technique, and others employed herein, are more fully described and illustrated in the '780, '781, '682, and '635 applications.

In step 306, a third attribute data value range is set. The third attribute data value range is preferably measured on a voxel scale between about 0 and about 255, however, may be between about −128 and about +127. The third attribute data value range is preferably set between about 50 and about 127. Other data value ranges may be preferred, depending on the application or selected attributes.

In step 308, a fourth attribute data value range is set. The fourth attribute data value range is also measured on a voxel scale between about 0 and about 255, however, may be between about −128 and +127. The fourth attribute data value range is preferably set between about −5 and about +5. Other data value ranges may be preferred, depending on the application or selected attributes.

In step 310, a third set of voxels are selected from the third attribute volume 402 that have a data value within the third attribute data value range. In step 312, a fourth set of voxels are selected from the fourth attribute volume 404 that have a data value within the fourth attribute data value range.

In step 314, the third set of voxels and the fourth set of voxels are imaged and represent the event boundary 406 illustrated in FIG. 4. The event boundary 406 represents the boundary or horizon of the limestone or dolomite that appears as a blue layer of voxels at the bottom of the third attribute volume 402 and the fourth attribute volume 404.

The techniques described in the '780 application may be utilized to image the third set of voxels and the fourth set of voxels. One technique involves combining the third set of voxels and the fourth set of voxels to form a combined set of voxels representing the event boundary 406. Each voxel in the combined set of voxels is assigned a new data value that is the same for each voxel in the combined set of voxels and is within a combined data value range between about 0 and about 127, measured on a voxel scale between about 0 and about 255. A voxel may then be selected from the combined set of voxels that represents a seed voxel. From this seed voxel, all other voxels from the combined set of voxels that are connected to the seed voxel and have the same data value may be autopicked and displayed to a user.

Alternatively, a voxel from at least one of the third set of voxels and the fourth set of voxels may be selected that represents a seed voxel. Voxels from the third set of voxels and the fourth set of voxels that are connected to the seed voxel and have the same data value may be autopicked and displayed to a user.

Figure 5:
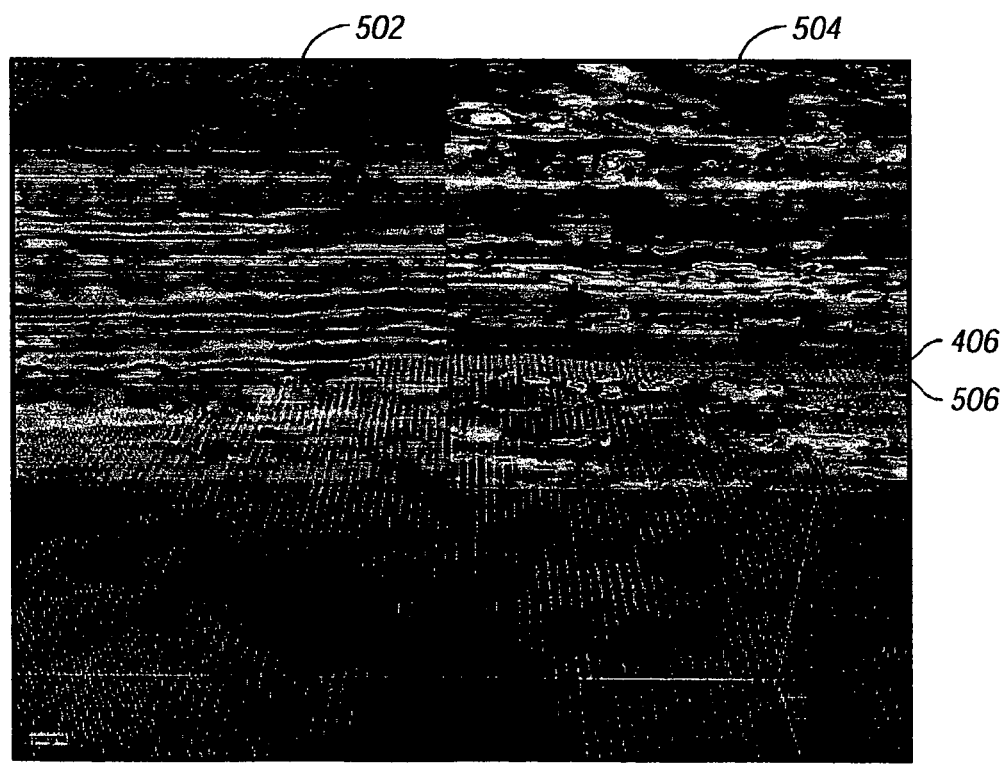
FIG. 5 is a color drawing illustrating seismic data attributes representing a region of interest and a preferred feature of the region of interest.

Once the event boundary 406 is defined, the geological region of interest relative to the event boundary 406 may be determined as illustrated in step 206. The presence of sand or sandstone is often found within about 300 feet above or below the limestone or dolomite event boundary 406. In FIG. 5, the region of interest 506 is illustrated comprising sand or sandstone below the event boundary 406.

In step 208, a first attribute volume 502 is calculated using the first attribute and a second attribute volume 504 is calculated using the second attribute. The first attribute volume 502 and the second attribute volume 504 are illustrated in FIG. 5. Although the first attribute volume 502 and the second attribute volume 504 are illustrated side-by-side in FIG. 5, they have the same spatial coordinates, but a different data value. The first attribute volume 502 and the second attribute volume 504 may be calculated in the same manner described in reference to calculating the third attribute volume 402 and the fourth attribute volume 404.

In step 210, a first attribute data value range is set based on a voxel scale between about 0 and about 255, however, may be between about −128 and +127. The first attribute data value range is preferably set between about 10 and about 140, based upon experimental results revealing the potential for gas-bearing sands where instantaneous amplitude voxels have a data value within this range. Although this is the preferred data value range for the first attribute, other data value ranges between about 37 and about 110; between about 37 and about 120; and between about 37 and about 130 may be used when the first attribute represents instantaneous amplitude. Other data value ranges may be preferred, depending on the application or selected attribute.

In step 212, a second attribute data value range is set based on a voxel scale between about 0 and about 255, however, may be between about −128 and +177. The second attribute data value range is preferably set between about 0 and about 48, based upon experimental results revealing the potential for gas-bearing sands where instantaneous frequency voxels have a data value within this range. Although this is the preferred data value range for the second attribute, other data value ranges between about 2 and about 36; and between about 3 and about 37, may be used when the second attribute represents instantaneous frequency. Other data value ranges may be preferred, depending on the application or selected attribute.

In step 214, a first set of voxels is selected from the first attribute volume 502 that have a data value within the first attribute data value range. The first set of voxels represent a preferred feature of the region of interest that comprises gas-bearing sands.

In step 216, a second set of voxels is selected from the second attribute volume 504 that have a data value within the second attribute data value range. The second set of voxels also represent the preferred feature of the region of interest.

In step 218, the first set of voxels and the second set of voxels representing the preferred feature (gas-bearing sands) are imaged. The techniques described in reference to imaging the third set of voxels and the fourth set of voxels in step 314 may be used here as well. The image of a portion of the voxels representing the gas-bearing sands is illustrated in FIG. 5 as a plurality of yellow points that reside in a plane containing the region of interest 506.

The techniques thus described are particularly useful as analytical, diagnostic and interpretive tools for any type of scientific data, including seismic data, and may be applied to the discovery and development of energy resources.

Those skilled in the art will therefore, appreciate that the foregoing techniques may be applied to the analysis of other types of attributes representing a region of interest and is not limited to geological formations and/or seismic data attributes. Consequently, the foregoing description of the invention is illustrative and various details of the illustrated construction or combinations of features of the various elements and/or steps may be made without departing from the spirit of the invention.

What is claimed is:

1. A method for analyzing a three dimensional region of interest relative to a predetermined event, the method comprising the steps of:
    defining a boundary of the event;
    defining the region of interest relative to the boundary of the event;
    selecting a first attribute and a second attribute, the first attribute and second attribute representing the region of interest;
    calculating a first attribute volume and a second attribute volume for the region of interest, the first attribute volume and the second attribute volume each comprising a plurality of voxels, each voxel being defined by a set of x,y,z coordinates and a data value;
    selecting a first set of voxels from the first attribute volume that have a data value within a first attribute data value range, the first set of voxels representing a preferred feature of the region of interest;
    selecting a second set of voxels from the second attribute volume that have a data value within a second attribute data value range, the second set of voxels representing the preferred feature; and
    imaging the first set of voxels and the second set of voxels.

2. The method of claim 1, wherein the preferred feature comprises at least one of sand or sandstone.

3. The method of claim 2, wherein the first attribute represents an acoustic signal comprising instantaneous amplitude and the second attribute represents an acoustic signal comprising instantaneous frequency.

4. The method of claim 3, wherein the region of interest is defined as within about 300 feet from the boundary of the event.

5. The method of claim 3, wherein the first attribute data value range is between about 10 and about 140, and the second attribute data value range is between about 0 and about 48, the first attribute data value range and the second attribute data value range being measured on a voxel scale between about 0 and about 255.

6. The method of claim 5, wherein the first attribute data value range is between about 37 and about 110, and the second attribute data value range is between about 2 and about 36.

7. The method of claim 5, wherein the first attribute data value range is between about 37 and about 120, and the second attribute data value range is between about 2 and about 36.

8. The method of claim 5, wherein the first attribute data value range is between about 37 and about 130, and the second attribute data value range is between about 3 and about 37.

9. The method of claim 1, wherein defining the boundary of the event comprises the steps of:
    selecting a third attribute, the third attribute representing the event;
    calculating a third attribute volume for the event, the third attribute volume comprising a plurality of voxels, each voxel being defined by a set of x,y,z coordinates and a data value;
    selecting a third set of voxels from the third attribute volume that have a data value within a third attribute data value range, the third set of voxels representing the boundary of the event; and
    imaging the third set of voxels.

10. The method of claim 9, wherein the event is a geological formation comprising at least one of dolomite or limestone.

11. The method of claim 10, wherein the third attribute represents an acoustic signal comprising at least one of amplitude, phase, frequency, instantaneous amplitude, instantaneous phase, instantaneous frequency, coherence or semblance.

12. The method of claim 11, wherein the third attribute data value range is between at least one of about 50 and about 127 and about −5 and about +5, the third attribute data value range being measured on a voxel scale between at least one of about 0 and about 255 and about −128 and about +127.

13. The method of claim 12, wherein imaging the third set of voxels comprises the steps of:
- selecting a voxel from the third set of voxels, the selected voxel representing a seed voxel;
- autopicking voxels from the third set of voxels that are connected to the seed voxel and have the same data value; and
- displaying the autopicked voxels from the third set of voxels to a user.

14. The method of claim 12, wherein imaging the third set of voxels comprises the steps of:
- assigning a new data value to each voxel in the third set of voxels, the new data value having the same data value within a new data value range between about 0 and about 127;
- selecting a voxel from the third set of voxels, the selected voxel representing a seed voxel;
- autopicking voxels from the third set of voxels that are connected to the seed voxel and have the same data value; and
- displaying the autopicked voxels from the third set of voxels to a user.

15. The method of claim 1, wherein imaging the first set of voxels and the second set of voxels comprises the steps of:
- combining the first set of voxels and the second set of voxels to form a combined set of voxels representing the preferred feature, each voxel in the combined set of voxels being assigned a new data value, the new data value having the same data value within a combined data value range between about 0 and about 127;
- selecting a voxel from the combined set of voxels, the selected voxel representing a seed voxel;
- autopicking voxels from the combined set of voxels that are connected to the seed voxel and have the same data value; and
- displaying the autopicked voxels from the combined set of voxels to a user.

16. The method of claim 1, wherein imaging the first set of voxels and the second set of voxels comprises the steps of:
- selecting a voxel from at least one of the first set of voxels and the second set of voxels, the selected voxel representing a seed voxel;
- autopicking voxels from the first set of voxels that are connected to the seed voxel and have the same data value;
- autopicking voxels from the second set of voxels that are connected to the seed voxel and have the same data value; and
- displaying the autopicked voxels from the first set of voxels and the second set of voxels to a user.

17. A system comprising a program storage device readable by a machine, the storage device embodying a program of instructions executable by the machine for analyzing a 3-D region of interest relative to a predetermined event, the instructions comprising the steps of:
- defining a boundary of the event;
- defining the region of interest relative to the boundary of the event;
- selecting a first attribute and a second attribute, the first attribute and second attribute representing the region of interest;
- calculating a first attribute volume and a second attribute volume for the region of interest, the first attribute volume and the second attribute volume each comprising a plurality of voxels, each voxel being defined by a set of x,y,z coordinates and a data value;
- selecting a first set of voxels from the first attribute volume that have a data value within a first attribute data value range, the first set of voxels representing a preferred feature of the region of interest;
- selecting a second set of voxels from the second attribute volume that have a data value within a second attribute data value range, the second set of voxels representing the preferred feature; and
- imaging the first set of voxels and the second set of voxels.

18. The system of claim 17, wherein the region of interest is a geological formation and the preferred feature comprises at least one of sand or sandstone.

19. The system of claim 18, wherein the first attribute represents an acoustic signal comprising instantaneous amplitude and the second attribute represents an acoustic signal comprising instantaneous frequency.

20. The system of claim 19, wherein the region of interest is defined as within about 300 feet from the boundary of the event.

21. The system of claim 19, wherein the first attribute data value range is between about 10 and about 140, and the second attribute data value range is between about 0 and about 48, the first attribute data value range and the second attribute data value range being measured on a voxel scale between about 0 and about 255.

22. The system of claim 21, wherein the first attribute data value range is between about 37 and about 110, and the second attribute data value range is between about 2 and about 36.

23. The system of claim 21, wherein the first attribute data value range is between about 37 and about 120, and the second attribute data value range is between about 2 and about 36.

24. The system of claim 21, wherein the first attribute data value range is between about 37 and about 130, and the second attribute data value range is between about 3 and about 37.

25. The system of claim 17, wherein defining the boundary of the event comprises the steps of:
- selecting a third attribute, the third attribute representing the event;
- calculating a third attribute volume for the event, the third attribute volume comprising a plurality of voxels, each voxel being defined by a set of x,y,z coordinates and a data value;
- selecting a third set of voxels from the third attribute volume that have a data value within a third attribute data value range, the third set of voxels representing the boundary of the event; and
- imaging the third set of voxels.

26. The system of claim 25, wherein the event is a geological formation comprising at least one of dolomite or limestone.

27. The system of claim 26, wherein the third attribute represents an acoustic signal comprising at least one of amplitude, phase, frequency, instantaneous amplitude, instantaneous phase, instantaneous frequency, coherence or semblance.

28. The system of claim 27, wherein the third attribute data value range is between at least one of about 50 and about 127 and about −5 and about +5, the third attribute data value range being measured on a voxel scale between at least one of about 0 and about 255 and about −128 and about +127.

29. The system of claim 28, wherein imaging the third set of voxels comprises the steps of:
- selecting a voxel from the third set of voxels, the selected voxel representing a seed voxel;
- autopicking voxels from the third set of voxels that are connected to the seed voxel and have the same data value; and
- displaying the autopicked voxels from the third set of voxels to a user.

30. The system of claim 28, wherein imaging the third set of voxels comprises the steps of:
- assigning a new data value to each voxel in the third set of voxels, the new data value having the same data value within a new data value range between about 0 and about 127;
- selecting a voxel from the third set of voxels, the selected voxel representing a seed voxel;
- autopicking voxels from the third set of voxels that are connected to the seed voxel and have the same data value; and
- displaying the autopicked voxels from the third set of voxels to a user.

31. The system of claim 17, wherein imaging the first set of voxels and the second set of voxels comprises the steps of:
- combining the first set of voxels and the second set of voxels to form a combined set of voxels representing the preferred feature, each voxel in the combined set of voxels being assigned a new data value, the new data value having the same data value within a combined data value range between about 0 and about 127;
- selecting a voxel from the combined set of voxels, the selected voxel representing a seed voxel;
- autopicking voxels from the combined set of voxels that are connected to the seed voxel and have the same data value; and
- displaying the autopicked voxels from the combined set of voxels to a user.

32. The system of claim 17, wherein imaging the first set of voxels and the second set of voxels comprises the steps of:
- selecting a voxel from at least one of the first set of voxels and the second set of voxels, the selected voxel representing a seed voxel;
- autopicking voxels from the first set of voxels that are connected to the seed voxel and have the same data value;
- autopicking voxels from the second set of voxels that are connected to the seed voxel and have the same data value; and
- displaying the autopicked voxels from the first set of voxels and the second set of voxels to a user.

* * * * *